US009015692B1

(12) United States Patent
Clavel

(10) Patent No.: US 9,015,692 B1
(45) Date of Patent: Apr. 21, 2015

(54) METHOD AND SYSTEM FOR CUSTOMIZING CONTENT ON A SERVER FOR RENDERING ON A WIRELESS DEVICE

(75) Inventor: Philippe Clavel, La Jolla, CA (US)

(73) Assignee: Phunware, Inc., Austin, TX (US)

( * ) Notice: Subject to any disclaimer, the term of this patent is extended or adjusted under 35 U.S.C. 154(b) by 862 days.

(21) Appl. No.: 12/018,141

(22) Filed: Jan. 22, 2008

Related U.S. Application Data

(60) Provisional application No. 61/000,134, filed on Oct. 23, 2007.

(51) Int. Cl.
*G06F 17/30* (2006.01)

(52) U.S. Cl.
CPC .... *G06F 17/30861* (2013.01); *G06F 17/30634* (2013.01); *G06F 17/30398* (2013.01); *G06F 17/30528* (2013.01)

(58) Field of Classification Search
CPC .................. G06F 17/30398; G06F 17/30634; G06F 17/30528; G06F 17/30861
USPC ....................................... 707/104.1; 717/168
See application file for complete search history.

(56) References Cited

U.S. PATENT DOCUMENTS

| | | | |
|---|---|---|---|
| 5,060,140 A | 10/1991 | Brown et al. | |
| 5,430,836 A | 7/1995 | Wolf et al. | |
| 6,336,124 B1 | 1/2002 | Alam et al. | |
| 6,343,318 B1 | 1/2002 | Hawkins et al. | |
| 6,345,279 B1 | 2/2002 | Li et al. | |
| 6,401,085 B1 * | 6/2002 | Gershman et al. | 1/1 |
| 6,457,030 B1 | 9/2002 | Adams et al. | |
| 6,490,627 B1 | 12/2002 | Kalra et al. | |
| 6,795,710 B1 | 9/2004 | Creemer | |
| 6,884,172 B1 | 4/2005 | Lloyd et al. | |
| 6,996,537 B2 | 2/2006 | Minear et al. | |

(Continued)

FOREIGN PATENT DOCUMENTS

| | | |
|---|---|---|
| EP | 1571547 A1 | 9/2005 |
| KR | 1020070003418 A | 1/2007 |

(Continued)

OTHER PUBLICATIONS

U.S. Appl. No. 12/001,001, filed Dec. 7, 2007, Clavel.

(Continued)

*Primary Examiner* — Jonathan C Teixeira Moffat
*Assistant Examiner* — Lynda Dinh
(74) *Attorney, Agent, or Firm* — Wilson Sonsini Goodrich & Rosati

(57) ABSTRACT

A server implemented method for processing data for rendering on a wireless device. A request to execute a generic application may be received. The server identifies a custom configuration for the generic application based on the wireless device access attributes, e.g., time zone, location, date, time zone, season, user's habit, user's interaction, user's interest, etc., wherein the custom configuration is operable to tailor the appearance of the generic application. The server configures the generic application based on the identified custom configuration to generate a customized application. The customized application may be executed on the server to generate a renderable customized application that is operable for rendering by the wireless device. The renderable customized application may be provided for transmission to the wireless device. The renderable customized application may be transmitted to the wireless device for rendering.

24 Claims, 4 Drawing Sheets

(56) References Cited

U.S. PATENT DOCUMENTS

| | | | |
|---|---|---|---|
| 7,222,154 B2 | 5/2007 | Dowling | |
| 7,286,562 B1 | 10/2007 | Vargo et al. | |
| 7,287,064 B1* | 10/2007 | Haldar et al. | 709/217 |
| 7,506,070 B2 | 3/2009 | Tran et al. | |
| 7,568,201 B2 | 7/2009 | Suryanarayana et al. | |
| 7,580,703 B1 | 8/2009 | Veselov et al. | |
| 7,599,665 B2 | 10/2009 | Sinivaara | |
| 7,627,354 B2 | 12/2009 | Khazaka et al. | |
| 7,636,792 B1 | 12/2009 | Ho | |
| 7,647,076 B1* | 1/2010 | Lavine et al. | 455/566 |
| 7,671,869 B2 | 3/2010 | Arnold et al. | |
| 7,801,891 B2* | 9/2010 | Hu et al. | 707/734 |
| 7,979,350 B1 | 7/2011 | Carion | |
| 8,009,619 B1 | 8/2011 | Clavel et al. | |
| 8,103,865 B2 | 1/2012 | Carion et al. | |
| 8,478,245 B2 | 7/2013 | Carion et al. | |
| 2002/0018487 A1 | 2/2002 | Chen et al. | |
| 2002/0103881 A1 | 8/2002 | Granade et al. | |
| 2002/0109718 A1 | 8/2002 | Mansour et al. | |
| 2002/0131404 A1 | 9/2002 | Mehta et al. | |
| 2003/0009495 A1* | 1/2003 | Adjaoute | 707/501.1 |
| 2003/0018521 A1 | 1/2003 | Kraft et al. | |
| 2003/0106022 A1 | 6/2003 | Goodacre et al. | |
| 2003/0120637 A1 | 6/2003 | Chithambaram et al. | |
| 2003/0151621 A1 | 8/2003 | McEvilly et al. | |
| 2003/0182419 A1 | 9/2003 | Barr et al. | |
| 2004/0133848 A1 | 7/2004 | Hunt et al. | |
| 2004/0210907 A1 | 10/2004 | Lau et al. | |
| 2004/0236860 A1 | 11/2004 | Logston et al. | |
| 2004/0252197 A1 | 12/2004 | Fraley et al. | |
| 2005/0172295 A1* | 8/2005 | Goring et al. | 719/310 |
| 2005/0223352 A1 | 10/2005 | Nishida | |
| 2006/0031387 A1 | 2/2006 | Hamzeh et al. | |
| 2006/0123053 A1* | 6/2006 | Scannell, Jr. | 707/104.1 |
| 2006/0129632 A1 | 6/2006 | Blume et al. | |
| 2006/0236308 A1 | 10/2006 | Lamb et al. | |
| 2007/0067373 A1 | 3/2007 | Higgins et al. | |
| 2007/0078009 A1 | 4/2007 | Lockton et al. | |
| 2007/0123229 A1 | 5/2007 | Pousti | |
| 2007/0124721 A1* | 5/2007 | Cowing et al. | 717/100 |
| 2007/0130156 A1 | 6/2007 | Tenhunen et al. | |
| 2007/0130333 A1 | 6/2007 | Bhalla et al. | |
| 2008/0016176 A1 | 1/2008 | Leitner | |
| 2008/0072139 A1 | 3/2008 | Salinas et al. | |
| 2008/0090513 A1* | 4/2008 | Collins et al. | 455/3.01 |
| 2008/0134018 A1 | 6/2008 | Kembel et al. | |
| 2008/0201225 A1* | 8/2008 | Maharajh et al. | 705/14 |
| 2009/0036105 A1* | 2/2009 | Carion et al. | 455/414.1 |
| 2009/0037329 A1 | 2/2009 | Coppinger et al. | |
| 2009/0037391 A1 | 2/2009 | Agrawal et al. | |
| 2009/0037724 A1* | 2/2009 | Carion et al. | 713/100 |
| 2009/0177663 A1 | 7/2009 | Hulaj et al. | |
| 2009/0220068 A1 | 9/2009 | Vialle et al. | |
| 2009/0227274 A1 | 9/2009 | Adler et al. | |
| 2009/0259940 A1 | 10/2009 | Moraes | |
| 2010/0174974 A1* | 7/2010 | Brisebois et al. | 715/223 |
| 2013/0339425 A1 | 12/2013 | Carion et al. | |

FOREIGN PATENT DOCUMENTS

| | | | |
|---|---|---|---|
| KR | 1020080022697 A | 3/2008 | |
| WO | WO 2002/103963 A1 | 12/2002 | |

OTHER PUBLICATIONS

Abrams, et al. UIML: An XML Language for Building Device-Independent User Interfaces. XML Conference Proceedings. Proceedings of XML, XX, XX, Dec. 1, 1999.

Ali, et al. Building Multi-Platform User Interfaces with UIML. Retrieved from the Internet: May 17, 2004. URL: arxiv.org/ftp/cs/papers/0111/0111024.pdf.

Grundy, et al. An Architecture for Building Multi-device Thin-Client Web User Interfaces. Advanced Information Systems Engineering. Jan. 1, 2002; 2348:728-732.

Final Office Action mailed Jun. 29, 2010 for U.S. Appl. No. 12/098,670, filed Apr. 7, 2008.

Written Opinion mailed Feb. 1, 2010 for International PCT Application No. PCT/US2008/009302, 8 pgs.

International Search Report and Written Opinion mailed Oct. 6, 2009 for International PCT Application No. PCT/US2009/001514, 6 pgs.

International Search Report and Written Opinion mailed Oct. 6, 2009 for International PCT Application No. PCT/US2009/001516, 10 pgs.

Written Opinion mailed Feb. 1, 2010 for International PCT Application No. PCT/US2008/009303, 8 pgs.

Office Action mailed Jan. 7, 2010 for U.S. Appl. No. 12/098,670, filed Apr. 7, 2008.

Office Action mailed Jul. 30, 2010 for U.S. Appl. No. 11/977,229, filed Oct. 23, 2007.

Office Action mailed Jun. 21, 2010 for U.S. Appl. No. 11/977,212, filed Oct. 23, 2007.

Office Action mailed Sep. 17, 2009 for U.S. Appl. No. 11/977,212, filed Oct. 23, 2007.

Simon, et al. Tool-Supported Single Authority for Device Independence and Multimodality. Proceedings of the 7th International Conference on Human Computer Interaction with Mobile Devices & Services, [Online]. Sep. 19, 2005; 91-98. Retrieved from the Internet: URL:http//portal.acm.orgicitation.cfm?id=1085777.1085793.

Vanderdonckt, et al. Synchronised Model-Based Design of Multiple User Interfaces. Internet Article, [online] 10 Sep. 10, 2004; 1-8. Retrieved from the Internet: URL: http://web.archive.org/web/20040910043454/http://www.isys.ucl.ca.be/bchi/members/q1i/pubNanderdonckt-IHM2001.pdf.

Ziegert, et al. Device Independent Web Applications-The Author Once-Display Everywhere Approach. Web Engineering; [Lecture Notes in Computer Science; LNCS], Springer-Verlag, Berlin/Heidelberg. Jul. 7, 2004; 3140:244-255.

Office Action mailed Jun. 14, 2012 for U.S. Appl. No. 11/888,803.

Office action dated Feb. 7, 2011 for U.S. Appl. No. 11/888,799.

Office action dated Apr. 8, 2011 for U.S. Appl. No. 12/001,001.

Office action dated Jun. 25, 2010 for U.S. Appl. No. 11/888,799.

Office action dated Oct. 31, 2011 for U.S. Appl. No. 12/001,001.

Notice of allowance dated Sep. 7, 2011 for U.S. Appl. No. 11/888,799.

Notice of allowance dated Oct. 29, 2014 for U.S. Appl. No. 13/865,987.

Notice of allowance dated Dec. 31, 2012 for U.S. Appl. No. 11/888,803.

* cited by examiner

METHOD AND SYSTEM FOR CUSTOMIZING CONTENT ON A SERVER FOR RENDERING ON A WIRELESS DEVICE

RELATED ART

This Application claims the benefit and incorporates by reference in its entirely the provisional application Ser. No. 61/000,134, inventor Philippe Clavel, entitled "A METHOD AND SYSTEM FOR CUSTOMIZING CONTENT ON A SERVER FOR RENDERING ON A WIRELESS DEVICE" that was filed on Oct. 23, 2007.

TECHNICAL FIELD

Embodiments of the present invention relate to the field of wireless communication systems. More particularly, embodiments of the present invention relate to a method and system for customizing content on a server for rendering on a wireless device.

BACKGROUND ART

Popularity of wireless devices has increased tremendously in recent years. For example, the use of cellular phones, personal digital assistants (PDAs), PalmPilots, BlackBerrys, laptops, IPods, IPhones, etc., have become prevalent in the market. The increase in the number of wireless devices has also increased the demand for various applications and content to run and be rendered on various wireless devices.

Unfortunately, applications and content are usually rendered generically on wireless devices. As a result, applications and content are generally rendered without considering various user attributes. For example, the appearance, look and feel of a requested application/content rendered is generic and the same regardless of the identity of the user, the location, the time, the date, the time zone and the user's habit, to name a few. Thus, the application/content rendered fails to impact the user as effectively as it would have if the appearance, the look and feel of application/content were to be tailored based on the wireless device attributes that includes user attributes. For example, tailoring application/content rendered to have an automobile theme would have a stronger impact on a user who is passionate about automobiles in comparison to rendering the application/content in a generic and bland manner.

Unfortunately, with growing use of wireless devices and ever increasing number of users, tailoring the appearance and customizing the look and feel of application/content for each user has become a daunting task. Moreover, the increase in the number of applications and the need to tailor the appearance of each application to a given user has increased the cost of developing applications/content.

Generally in today's global society, the same content/application may be accessed by different users in different locations and in different time zones. For example, an application/content may be accessed by a user in the United States while the same application/content may be accessed by another user in Australia. Accordingly, even though the time zone, the time, the location and the date that the application/content is accessed is different the same generic application/content is rendered for each user.

Rendering generic application/content without customizing the appearance, look and feel of the application/content is undesirable because it fails to consider various factors such as the season. For example, the appearance, look and feel of an application/content that is accessed by a user in the United States during winter is the same as the appearance, look and feel of the same application/content that is accessed by a user in Australia even though it is summer time in Australia. As a result, a fresh cooling appearance that may be appealing to a user in the midst of the summer in Australia would not be desirable for a user in the cold winter days of Chicago for example.

Similarly, rendering generic application/content without customizing the appearance, look and feel of the application/content based on the time of the day the request is made is undesirable. For example, the appearance, look and feel of the application/content in the morning cannot be customized to have an up tempo feel to it, energizing the user to take on user's daily life without considering the time of the day. Similarly, the appearance, look and feel of the application/content in the evening cannot be customized to have a relaxing and soothing feel to enable the user to unwind without considering the time. Accordingly, not considering the time limits the content/application provider to generically render content/application. Thus, content/application providers fall short of fully impacting the user and further fail to positively impact the user's experience.

Under similar rationale, rendering generic application/content without considering the time zone is undesirable. For example, a user in the United States may request to access an application/content while a user in Australia may request to access the same application/content at the same time. It may be day time in the United States and night time in Australia. Thus, not considering the time zone fails to enable the content/application provider to customize the appearance, look and feel of the application/content to have a full impact on the user's experience, as discussed and presented above.

Furthermore, rendering generic application/content without considering the date is undesirable because the appearance of an application/content cannot be customized to have a conforming theme based on a particular date. For example, during Halloween, content/application cannot be customized to have a conforming appearance, look and feel of Halloween without considering the date. Similarly, during Christmas, content/application cannot be customized to have a conforming appearance, look and feel of Christmas without considering the date. Thus, content/application providers fall short of providing the user with a positive and full impact of a particular date.

Moreover, rendering generic application/content without considering the location of the user is undesirable because the appearance of an application/content cannot be customized to have a conforming theme based on the location. For example, on the Fourth of July, an application/content provider may wish to customize the appearance, look and feel of content/application to have a patriotic theme whereas such a theme would be unnecessary elsewhere in the world. Thus, content/application providers are unable to automatically customize the appearance, look and feel of content/application to be rendered by users in different location without considering the location of the user.

In general, wide mass advertising without considering attributes of a user is ineffective with a very low success rate at best. In general, factors such as time, time zone, location, season, user's behavior, user's interest, etc. are not considered by application/content providers to customize offerings to the wireless device user, thereby resulting in a low success rate and ineffective advertising. For example, ignoring that it is morning and that a user is near a coffee shop, results in a lost opportunity to send a coupon for a cup of coffee when the user is accessing an application/content on a wireless device. Similarly, ignoring that it is evening and that a user is at home and have previously searched for movie rentals, results in a lost opportunity to send a coupon for renting a movie when the user is accessing an application/content on a wireless device. Thus, advertisers are unable to tailor their advertisings to target users using an application/content based on a wireless device access attributes, e.g., location, time, user's behavior, time zone, date, etc.

Moreover, customizing content/application by a wireless device is undesirable because it places a drain on a limited processing power of a wireless device. Moreover, customizing content/application by a wireless device places a drain on the battery power of a wireless device. Furthermore, the entire library of attributes needed to customize a generic application/content to provide it with a certain appearance, look and feel cannot be stored on a wireless device due to limited storage availability on a wireless device.

SUMMARY

Accordingly, a need has arisen to customize the appearance, look and feel of a generic application/content based on a wireless device access attributes, e.g., time, location, time zone, season, user's habit, etc. Moreover, a need has arisen to customize the appearance, look and feel of a generic application/content, on the server, based on a wireless device access attributes without impacting the amount of processing by a wireless device, thereby conserving battery power and speeding up the processing time.

Furthermore, it is advantageous to customize the appearance, look and feel of a generic application/content in a cost effective manner. Moreover, a need has arisen to tailor and provide additional content, e.g., advertising, along with a content/application in order to target a given user, thereby improving the success rate of advertising. It will become apparent to those skilled in the art after reading the detailed description of the present invention that the embodiments of the present invention satisfy the above mentioned needs.

According to one embodiment of the present invention, a server receives a request for an application/content from a wireless device. In response to the request, the server may determine the wireless device access attributes. Wireless device attributes include time, location, time zone, season, user's habit, user's attributes, etc. for the wireless device requesting the application/content.

In one embodiment, the time zone of the wireless device may be used to determine the time of the day that the application/content is requested. However, the date on either the server or the wireless device may be used to determine the date that the application/content is requested. In one exemplary embodiment, a global positioning system (GPS) on the wireless device may be used to determine the location of the user. Alternatively, or in conjunction with GPS capability, packets received from the wireless device may be analyzed to determine the location of the wireless device cellular tower, thereby locating the location of the wireless device. In one embodiment, user's prior requests for application/content, search results and similar attributes from a cookie stored either on the wireless device and/or on the server may be used to determine the user's interests, habits, passions, etc.

The server may determine and locate the generic application/content requested by the wireless device. According to one embodiment, once the wireless device attributes are determined by the server, the server may search in a memory component, e.g., cache, to determine whether a configured version of the generic application/content based on the wireless device attributes is available. The configured version of the generic application/content may be executed on the server resulting in a renderable customized application/content when the configured version of the generic application/content is available. Thus, the renderable customized application/content may be sent to the wireless device for rendering. Similarly, the server may search in a memory component, e.g., cache, to determine whether a renderable customized application that is based on the wireless device attributes is available. The renderable customized application/content based on the wireless device attributes may be sent to the wireless device if it is available. As a result, the wireless device receives a renderable customized application/content that is operable to render content/application without further processing and execution by the wireless device.

On the other hand, when the configured version of the generic application/content based on the determined wireless device attributes is not available on the server, the server may configure the generic application/content based on the determined wireless device attributes to customize the appearance, look and feel of the generic application/content. The configured generic application/content may be executed by the server resulting in a renderable customized application/content. The renderable customized application/content may be rendered by the wireless device without further processing and execution. Thus, the renderable customized application/content may be provided for transmission to the wireless device and may be further transmitted for rendering on the wireless device. In one embodiment, the configured version of the generic application/content and/or the renderable customized application/content may be stored for later retrieval.

One embodiment of the present invention pertains to a method for processing data for a wireless device including receiving a request to execute a generic application that generates generic content operable to be rendered on the wireless device. The server may then identify a custom configuration for the generic application based on the wireless device access attributes, wherein the custom configuration is operable to tailor the appearance of the generic application. Moreover, the server may configure the generic application based on the identified custom configuration to generate a customized application. The customized application may be executed on the server to generate a renderable customized application that is operable for rendering by the wireless device. The renderable customized application may be provided for transmission to the wireless device.

The wireless device access attributes may be selected from a group consisting of location, time, date and user attributes. The user attributes may include user's behavioral interaction with the wireless device, user's habit and user's interests. The user attributes may be determined by using applications accessed by the user and by using searches made by the user. The renderable customized application may be transmitted to the wireless device for rendering.

According to one embodiment, the generic application may be provided with additional content, wherein the additional content is advertising tailored to the user. The tailoring of the advertising may be selected from a group consisting of the time of day that the request to execute the generic application is sent, the date that the request to execute the generic application is sent and the location from which the request to execute the generic application is sent.

As a result, embodiments of the present invention relieve software vendors and content providers from tailoring appearance, look and feel of their applications/content because the server automatically tailors the appearance, look and feel of a generic application/content based on a wireless device access attributes. Thus, the cost of developing application/content is reduced. Moreover, tailoring the appearance, look and feel of a generic application/content based on a wireless device access attributes, e.g., time, location, time zone, season, date, etc., improves user's experience. Similarly, tailoring the appearance, look and feel of a generic application/content based on user's interest, e.g., habit, enhances user's experience by presenting content/application in a manner that conforms to user's interest, e.g., automobile theme for a car enthusiast.

Additionally, providing tailored information, e.g., advertising, improves the success rate of advertising by presenting targeted information that may be of particular interest to a user. Moreover, embodiments of the present invention tailors the appearance, look and feel of a generic application/content on the server, thereby reducing the amount of processing by the wireless device and conserving battery power as a result.

DETAILED DESCRIPTION

Figure 1:
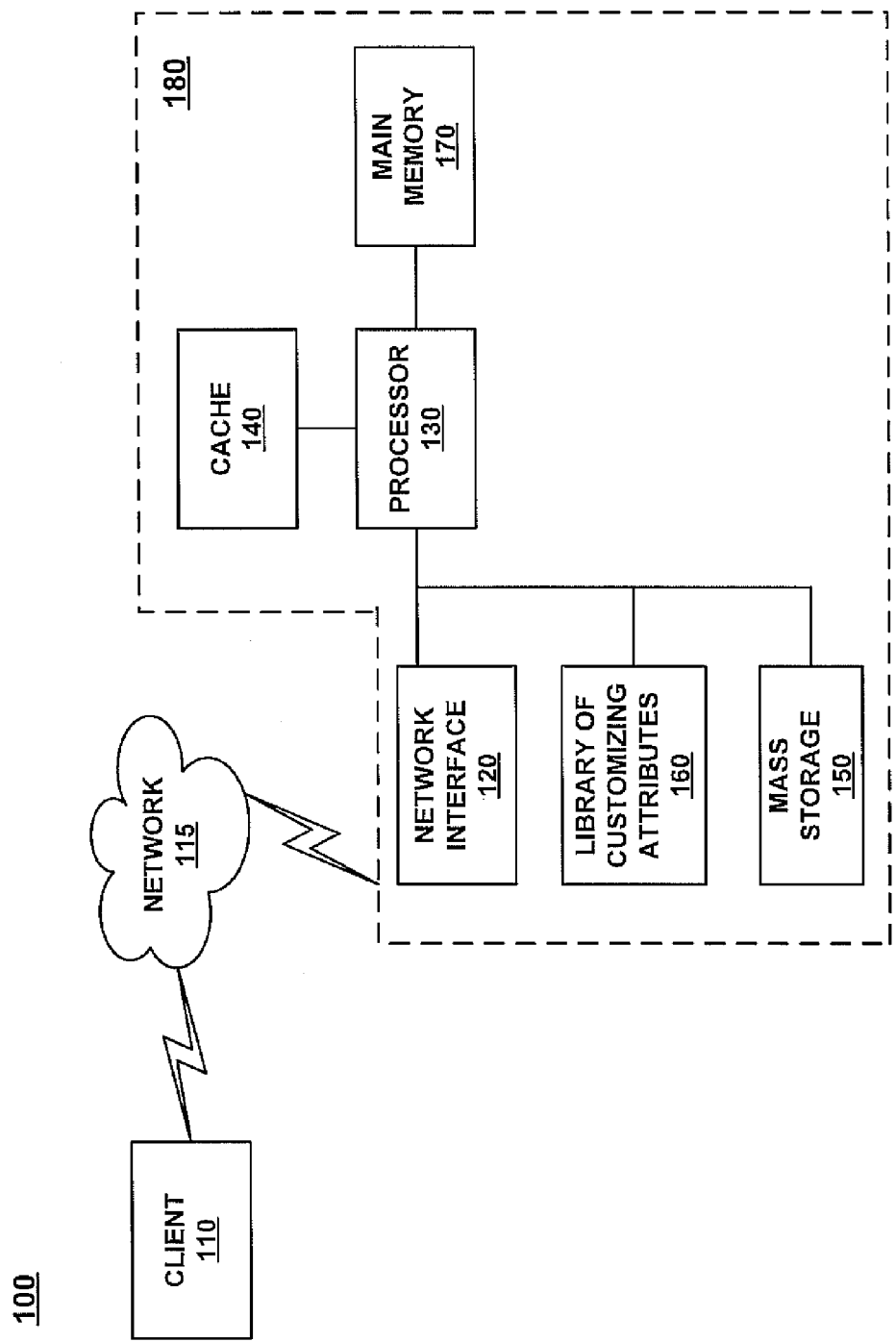
FIG. 1 shows an exemplary system in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternative, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or "initiating" or "receiving" or "analyzing" or "generating" or "constructing" or "outputting" or "collecting" or "monitoring" or "outputting" or "storing" or "sending" or "receiving" or "identifying" or "using" or "rendering" or "translating" or "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A Method and System for Customizing Content on a Server for Rendering on a Wireless Device Referring now to FIG. 1, an exemplary system 100 in accordance with one embodiment of the present invention is shown. As depicted in FIG. 1, system 100 includes a client 110 that is in communication with a server 180 via a communication network 115. The client 110 is typically a wireless handheld device, such as, for example, a cellular phone, personal digital assistant (PDA), PalmPilot, BlackBerry, laptop computer, IPods, IPhone, etc. The client 110 is communicatively coupled to the server 180 via communications network 115.

The FIG. 1 embodiment illustrates a scenario where the client 110 requests a generic content/application from the server 180 via the communication network 115. The generic content/application request by the client 110 is processed by the server 180. The server 180 tailors the generic content/application based on the wireless device access attributes, e.g., time, date, time zone, season, location, user's attributes, user's interest, user's habit, etc. It is appreciated that the application/content may include software games, software applications, text, image, animation, video content, streaming data, images within a frame of an animation/video content, etc.

Tailoring a generic content/application based on a wireless device access attributes impacts the user more in comparison to rendering content/application in a generic and bland manner. For example, if it is determined that the user is accessing a generic application/content in the summer time, the appearance of the generic application/content may be tailored to have a cooling appearance and summer like look and feel. Similarly, when it is determined that a user is accessing a generic application/content in the morning, the appearance of the application/content may be tailored to have an up tempo and energizing look and feel whereas in the evening the generic application/content may be tailored to have a relaxing and soothing appearance allowing the user to unwind. Moreover, wireless device access attributes may be used to provide additional content, e.g., targeted advertising, that may be of an interest to the user. Thus, presenting a tailored content based on user's interest, habit, etc. is not only valuable to the user but it also improves the effectiveness of advertising.

As shown in the FIG. 1 embodiment, the server 180 includes one or more processor(s) 130 coupled to a main memory 170 (e.g., via a system memory bus). The processor 130 is coupled to a network interface 120, a library of customizing attributes 160, and a mass storage device 150 (e.g., via an expansion bus). It is appreciated that the components shown are exemplary and that the server 180 may include additional or fewer components. The processor 130 is also shown coupled to a cache memory 140.

The network interface 120 facilitates communication between the server 180 and the client 110 via the communication network 115. The processor 130 is operable to process computer readable instructions/data that may be stored in main memory 170, the cache 140, the mass storage device 150, and/or the library of customizing attributes 160, to name a few. It is appreciated that the processor 130 is further operable to execute and process information and data from external devices (e.g., CD-ROM, USB key, floppy, etc.) that may also connect to the server 180 (e.g., via the network interface 120, a USB port, etc.). It is appreciated that a plurality of instructions collectively known as a customizing engine may be executed by the processor 130 to customize the appearance, look and feel of a generic application/content.

The library of customizing attributes 160 is typically a computer readable memory that may store information for tailoring appearance, look and feel of a generic application/content based on various factors generally known as a wireless device access attributes, e.g., time, date, time zone, season, user's attributes, user's interest, user's habit, etc. For example, the library of customizing attributes 160 may store various themes, e.g., Christmas theme, Halloween theme, automobile theme, winter season theme, summer season theme, etc. for various wireless device access attributes, to name a few.

It should be noted that although the library of customizing attributes 160 is shown in FIG. 1 as a discreet component, the library of customizing attributes 160 can be implemented as a software data structure stored within, for example, main memory 170, cache 140, the mass storage device 150, or the like.

The main memory 170 is typically a random access memory (RAM) for storing information and instructions to be executed by processor 130. The main memory 170 may also be used for storing temporary variables or other intermediate information during execution of instructions to be executed by processor 130.

The mass storage device 150 is typically a non-volatile storage device for providing persistent storage for information and instructions for processor 130. The mass storage device is typically implemented as a hard disk drive, drive array, storage area network (SAN), or the like.

The instructions for implementing the customizing engine are operable to configure generic data based on the wireless device 110 access attributes. For example, the server 180 may use the wireless device access attributes and determine that the user is an automobile enthusiast. As a result, a plurality of customizing attributes for a car enthusiast may be fetched from the library of customizing attributes 160. The customizing attributes may be used to tailor a generic application/content to a car theme. Similarly, the customizing engine may configure a generic application/content to appear, look and feel like Christmas during Christmas holiday. In one embodiment, the customizing engine may configure a generic application/content to appear, look and feel based on the time of the day that the generic application/content is accessed. For example, in the morning the appearance, look and feel of a genetic application/content may be customized to have an up tempo and upbeat appearance to energize the user to take on his daily routine. In contrast, in the evening, the appearance, look and feel of a generic application/content may be customized to appear soothing and relaxing to enable the user to unwind from a long day at work.

It is appreciated that the term "computer-readable medium" as used herein refers to any medium that participates in providing instructions to processor 130 for execution. Such a medium may take many forms, including but not limited to, non-volatile media, volatile media, and transmission media. Non-volatile media includes, for example, optical or magnetic disks, to name a few. Volatile media includes dynamic memory, such as main memory 170. Transmission media includes coaxial cables, copper wire and fiber optics, including the wires that comprise bus. Transmission media can also take the form of acoustic or light waves, such as those generated during radio wave and infrared data communications.

Figure 2:
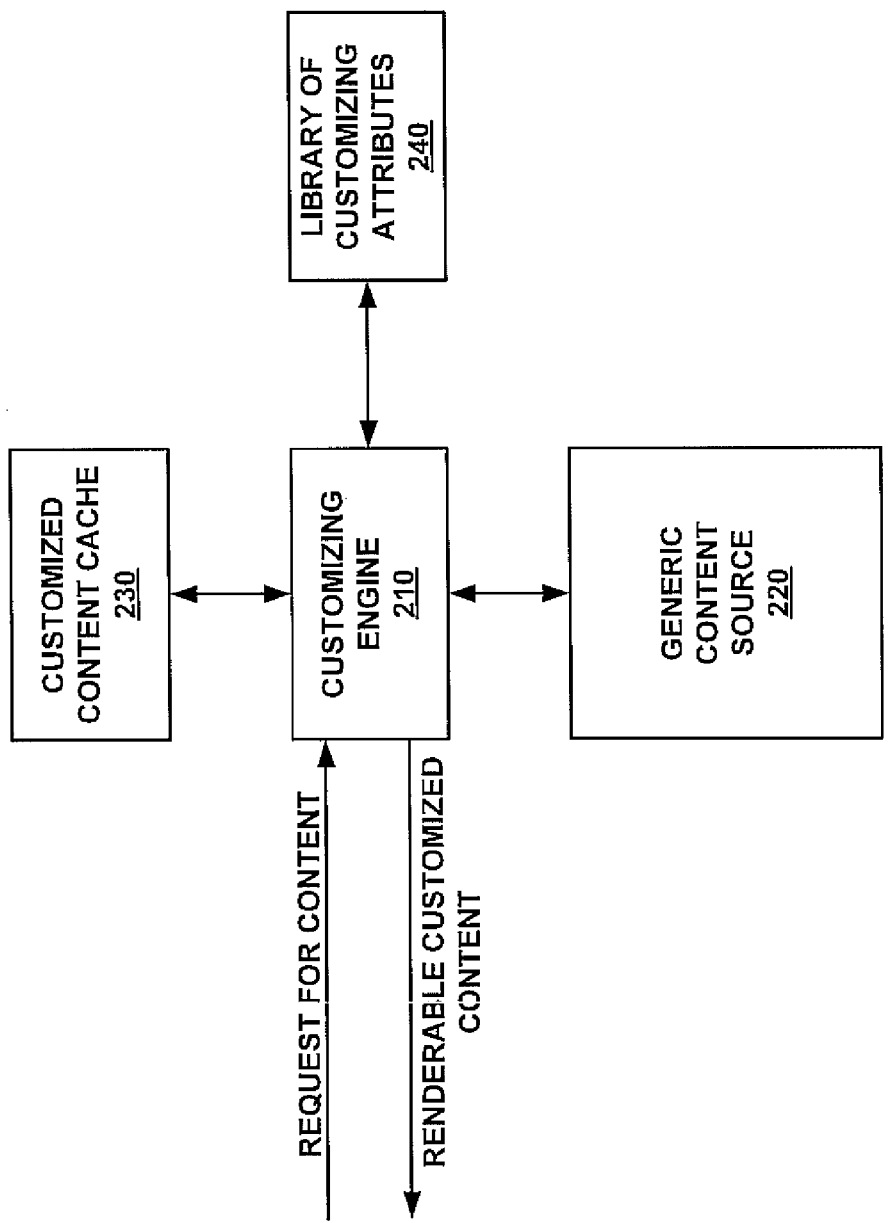
FIG. 2 shows an exemplary software based process executed by a processor to implement a customizing engine in accordance with one embodiment of the present invention.

Referring now to FIG. 2, an exemplary software based process executed by the processor to implement a customizing engine 210 in accordance with one embodiment of the present invention is shown. The customizing engine 210 may be a plurality of instructions that are executed by the processor 130 to customize the appearance, look and feel of a generic application/content. In one embodiment, the customizing engine 210 may be in communication with a generic content source 220, a customized content cache 230 and a library of customizing attributes 240.

According to one embodiment, the generic content source 220 stores generic application/content. Generic application/content may include content to be rendered, e.g., a website, software games, software applications, etc.

The library of customizing attributes 240 may store a plurality of customizable attributes and themes. For example, various themes may include a summer theme, winter theme, fall theme, automobile theme, morning theme, evening theme, holiday theme, movie theme, etc., to name a few. Various themes and customizable attributes are generically known and referred to as custom configuration.

The customized content cache 230 is operable to store a customized application. The customized application is the generic application/content that is tailored based on the wireless device access attributes. It is appreciated that the customized content cache 230 may also store the customized application/content that is executed by the server. Executed customized application/content may be generally known and referred to as a renderable customized application. The renderable customized application may be used by a wireless device to render the customized application/content without further need to execute and/or customize the content.

In one exemplary embodiment, the customizing engine 210 receives a request for a generic content/application from a wireless device. It is appreciated that the request may include information regarding the wireless device access attributes. For example, the wireless device access attributes may include information regarding the time, the time zone, the date, the season, the location, the user's attributes, the user's interests, user's habits, etc.

It is appreciated that the wireless device access attributes may be obtained from the wireless device. For example, the time that the wireless device is requesting an application/content may be used for a time access attribute. Similarly, the date that the wireless device is requesting an application/content may be used for a date access attribute.

When a wireless device is equipped with GPS capabilities, the location access attribute may be sent from the wireless device as determined by using the GPS capabilities of the wireless device. In another embodiment, information in the packet data sent from the wireless device may be processed to determine the location. For example, the particular cellular base station, as determined by processing a data packet, may be determined. Thus, the cellular structure where the wireless device is requesting an application/content may be determined, thereby locating the proximity of the wireless device.

To determine the wireless device access attributes that includes user's attributes, user's habit, user's interest, etc., a cookie tracking user's interaction that is either stored by the wireless device or by the server may be used. It is appreciated that a combination of the above mentioned methods may be used to determine other wireless device access attributes, e.g., season, time zone, etc. Moreover, it is appreciated that the discussed wireless device access attributes are exemplary and are not intended to limit the scope of the present invention. Furthermore, it is appreciated that the method by which the wireless device access attributes are obtained are exemplary and are not intended to limit the scope of the present invention.

The customizing engine 210 may use the request to determine the requested generic application/content by searching the generic content source 220. As a result, the requested generic application/content is determined and may be accessed.

The customizing engine 210 may use the wireless device access attributes in order to search through a plurality of customizing attributes to find the best matched custom configuration. For example, the customizing engine 210 may use the wireless device access attributes and search in the library of customizing attributes 240 to determine a custom configuration that closely matches the wireless device access attributes. Accordingly, the determination of the custom configuration may be by searching the library of customizing attributes 240 and comparing a plurality of customizing attributes to that of the wireless device access attributes.

The customizing engine 210 may send a renderable customized application stored in the customized content cache 230 to the wireless device if the renderable customized application is available. The renderable customized application is the executed version of the generic application/content that has been tailored based on the wireless device access attributes. The renderable customized application be stored in the customized content cache 230 or similar components. On the other hand, if the renderable customized application/content is not found, the customizing engine 210 proceeds to customize and tailor the generic application/content based on the wireless device access attributes.

The customizing engine 210 may use the determined custom configuration to tailor the appearance, look and feel of the requested generic application/content. Tailoring the appearance, look and feel of the requested generic application/content based on the determined custom configuration generates a customized application. For example, when the wireless device access attributes is based on time, a morning like custom configuration may be selected from the library of customizing attributes 240 when the time that the request is made is in the morning. Thus, the appearance, look and feel of the generic application/content may be tailored to have a morning like appearance by for example having an upbeat with an up tempo look and feel. In contrast, when the custom configuration is an "evening theme", generic application/content may be tailored to have mellow colors with a relaxing and soothing appearance, look and feel, thereby enabling the wireless device user to relax and unwind from a long day of working.

It is appreciated, that the particular way generic application/content are tailored and described here are exemplary and should not be construed to limit the scope of the present invention. For example, in another exemplary embodiment, the generic application/content may be tailored to have sunshine as its background to represent the morning time.

Similarly, when the wireless device access attributes is based on location, e.g., user being close to a coffee shop, the identified custom configuration, e.g., a coupon for a cup of coffee, may be sent to the user along with the generic application/content. Thus, generic application/content is tailored with a information, e.g., a coupon. As a result, not only the user benefits from the targeted information but advertising becomes a more effective tool to target potential customers.

Similarly, when the wireless device access attributes is based on user's habit and interest, e.g., a car enthusiast, an identified custom configuration that tailors the appearance of the generic application/content based on the identified custom configuration, e.g., car theme, may be used. When the wireless device access attributes are based on a date, e.g., Halloween day, an identified custom configuration tailors the appearance of the generic application/content based on the date, e.g., Halloween theme. Similarly, the appearance of a generic application/content may be tailored to have a patriotic look and feel during the Fourth of July holiday.

The customized application is the generic application/content that has an appearance, look and feel based on the determined custom configuration. Moreover, as described above the custom configuration is determined by using the wireless device access attributes. The customized application may be stored in the customized content cache 230 for later access. It is appreciated that the customized application may be executed by the processor to generate a renderable customized application/content. The renderable customized application/content may be a set of low level commands that may be used by the wireless device to render the customized application/content. The renderable customized application/content may also be stored in the customized content cache 230 or other similar memory components for later access. The renderable customized content may be provided and transmitted to the wireless device for rendering.

It is appreciated that the custom configuration may configure various attributes including text fonts, text colors, background colors, background images, border thickness, border colors, frame colors of menus, style of menus (e.g., rounded, rectangle and etc.), styles of check boxes (square, round and etc.), images of non-selected icons, images of selected icons, graph colors, information for drawing (e.g., particular text font at a particular location, particular color at a given location, shape of a given size, image at a given point and etc.), icons to use for representing hierarchical data, colors of the bar/animation representing the progress when downloading and an animation to use when download is in progress and the like. It is appreciated that the custom configuration discussed above are exemplary and are not intended to limit the scope of the present invention. It is further appreciated that the custom configuration for configuring the appearance and the "look and feel" of the generic application/content may be known as "skinnable attributes."

Figure 3:
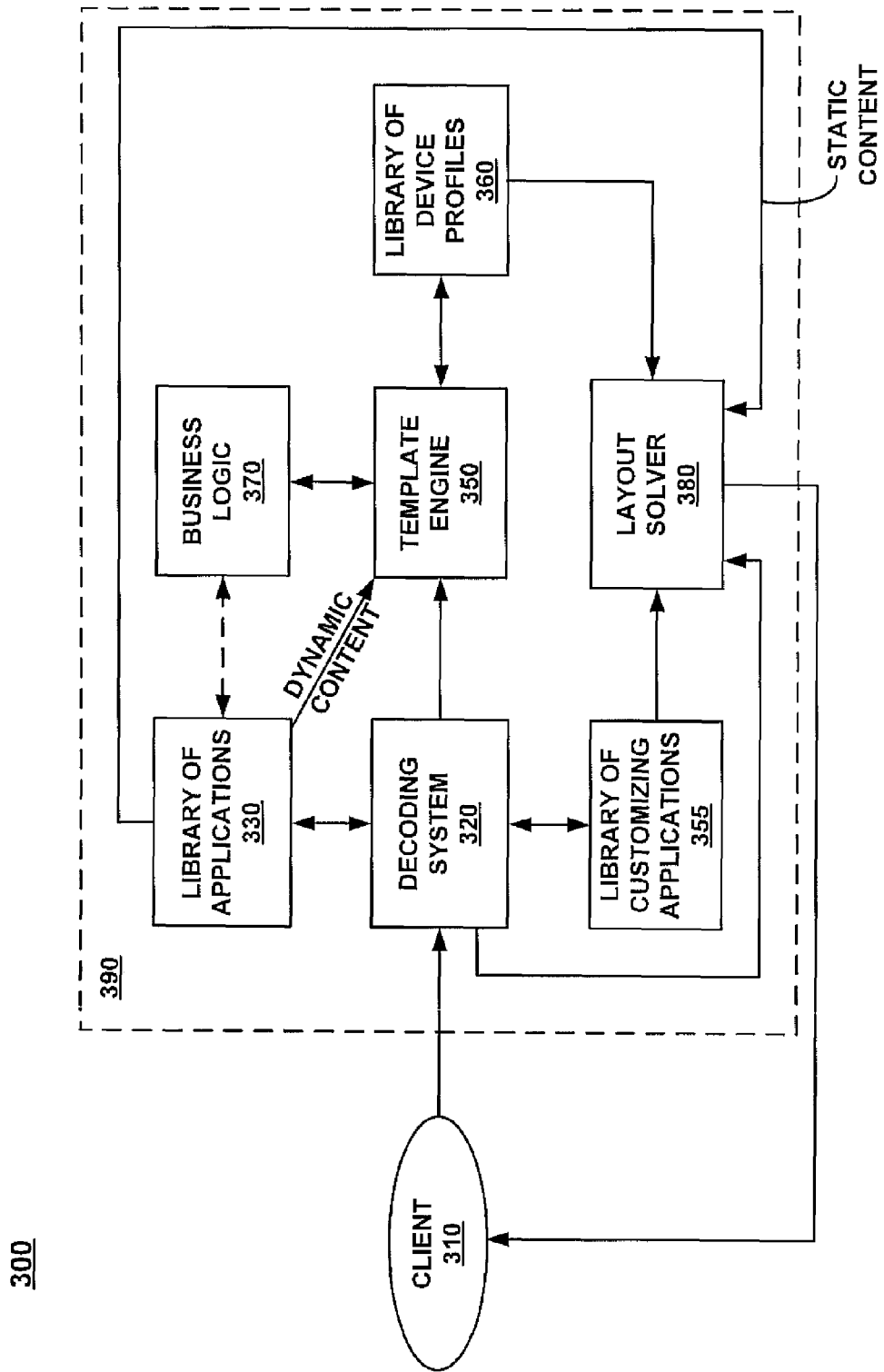
FIG. 3 shows an exemplary remote server block diagram in accordance with one embodiment of the present invention.

Referring now to FIG. 3, an exemplary remote server block diagram 300 in accordance with one embodiment of the present invention is shown. A client 310 is in communication with a remote server 390. As discussed above, the client 310 may initially send a message to the remote server 390 to request an application/content. The request may accompany with the client's 310 access attributes. A decoding system 320 of the server 390 receives the message from the client 310.

The decoding system 320 in response to the received message may access a library of generic applications/contents 330 in order to locate and execute the requested application (e.g., Texas Holdem Poker, Internet and the like). It is appreciated that applications/contents stored in the library of applications 330 are generic regardless of the device type and the user. The requested application is then executed on the server 390. An application is defined by an application description file and a set of static resources, e.g., images, sounds, URLs, etc. The application description file describes all the screens of the application and the custom configuration of the application.

A library of customizing attributes 355 may be accessed to determine the best custom configuration that matches the wireless device access attributes. As described above, the custom configuration may be used to tailor the appearance of a generic application/content. The best custom configuration may be sent to a layout solver 380.

During application execution, pages are generated for display on the wireless device. During a page generation, the server determines whether the requested application generates static or dynamic data. For static applications such as viewing pictures or for pure text, the decoding system 320 may send a static page to a layout solver 380 described below. On the other hand for dynamic pages such as real-time data, the server 390 inserts the dynamic data into a generic template and alters the resultant template based on the client profile.

More specifically, for dynamic data, the decoding system 320 communicates a page of the application to a template engine 350. The page is generic template describing the screen in a high level language, e.g., XML. The template engine 350 generates a dynamic page template by merging dynamic data with the generic template. The template engine 350 may be coupled to business logic 370 that computes dynamic data according to application execution. The business logic 370 may use model-view-controller architecture such that the user interface does not affect data handling and such that the data can be re-organized without changing the user interface. The request through the user interface of the wireless device results in an action in the business logic unit 370.

The business logic 370 may supply dynamic data to the template engine 350 for incorporation into a generic template. The template engine 350 according to one embodiment merges dynamic data provided by business logic 370 and generates screens of the requested application executed by the server to form a generic template. Thus, the template engine 350 provides a high level template (e.g., extensible markup language (XML) format) that includes the merged screens of application and dynamic data provided by the business logic 370.

According to one embodiment, the template engine 350 is also coupled to a library of device profiles 360. The library of device profiles 360 may include information on device capabilities. For example, the library of device profiles 360 may include information on the screen size, screen resolution, color resolution and the like. The server determines the client's 310 capabilities by accessing the library of device profiles 360 and based on the received message from the client 310 identifying itself (e.g., brand, model, memory size and the like).

As a result, the template engine 350 may eliminate content from its dynamic template output that is not supported by the client 310. For example, if the application includes an audio component but the client 310 does not have audio capability, then the template engine 350 may eliminate audio component from the generic template output. In another example, when the client 310 is short in memory, the template engine 350 may eliminate big images. Thus, a dynamic and high level template that includes data supported by the client 310 is generated. The dynamic template output from the template engine 350 may be in a high level language, e.g., XML.

The generic template supplied from 330 and the dynamic template supplied from 350 do not contain any specific or actual screen dimensions but rather only contain relative screen locations. At this stage, the templates are not very device specific regarding screen sizes, dimensions, etc.

The template engine 350 sends the high level and dynamic template to the layout solver 380. The layout solver 380 may also receive static page descriptions from the decoding system 320 and/or the library of applications 330. The layout solver 380 further receives the determined custom configuration based on the wireless device access attributes. In response to receiving the high level and dynamic template, static pages and/or the determined custom configuration, the layout solver 380 translates the received information into a series of basic commands based on the client's capabilities. It is appreciated that the basic commands are tailored such that they tailor the appearance, look and feel of the generic application/content based on the wireless device access attributes, e.g., time, time zone, date, location, user's habit, etc.

The layout solver 380 may access the library of device profiles 360 to determine client's capabilities. The layout solver 380 may use the client's capabilities to tailor the received information (e.g., static application and/or dynamic application) based on the requesting client's 310 capability.

It is appreciated that basic commands may be low level compilation operable to render application content on the client 310 using the rendering blocks of the wireless device. For example, basic commands may layout page content for the requested application. Accordingly, the layout solver 380 receives a dynamic template from the template engine 350 and/or receives a static page from the decoding system 320 and/or the library of applications 330 and translates it to device specific commands based on the client's capability.

It is appreciated that the specific commands based on the client's capability may be written in a syntax that is device generic regardless of the wireless device type. However, the parameters of the basic commands are tailored based on the wireless device capabilities and the wireless device access attributes. The basic commands are then transmitted to the client 310 for rendering.

Figure 4:
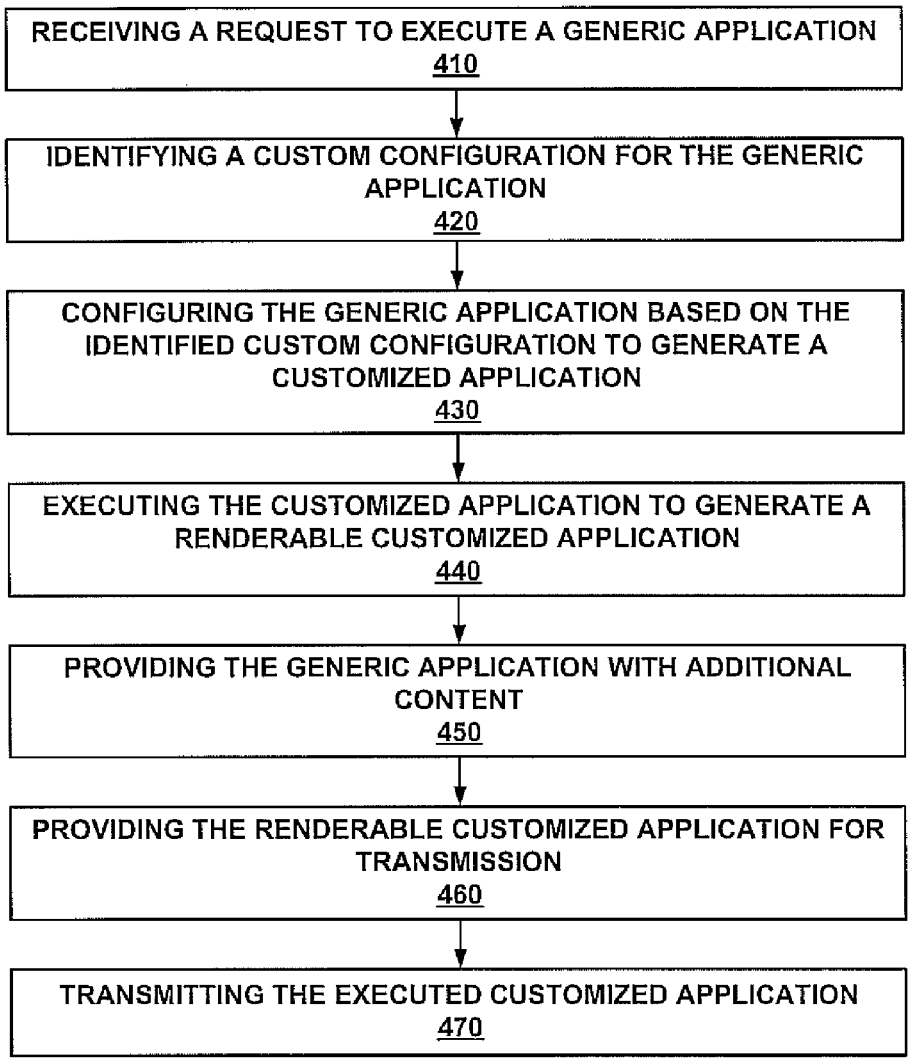
FIG. 4 shows an exemplary server controlled flow diagram for processing data for a wireless device in accordance with one embodiment of the present invention.

Referring now to FIG. 4, an exemplary server controlled flow diagram 400 for processing data for a wireless device in accordance with one embodiment of the present invention is shown. At step 410, a request to execute a generic application/content is received. The generic application/content may be rendered on a wireless device. At step 420, a custom configuration for a generic application/content is identified. In one embodiment, the custom configuration is based on the wireless device access attributes.

The wireless device access attributes include location, time, time zone, user attributes, user's interest, user's habit, user's interaction with the wireless device, season, date, etc. The user's habit, interest and interaction may be determined using a cookie that may store information such as searches made by the user. Similarly, the user's habit, interest and interaction may be determined using a cookie that may store information such as user's prior access of various applications. It is appreciated that cookies may be stored on the server and/or the wireless device. The custom configuration may be selected from a plurality of custom configurations that closely represents the wireless device access attributes.

At step 430, the generic application/content may be configured based on the identified custom configuration. Thus, a customized application is generated. Configuring the generic application/content tailors the appearance, look and feel of the generic application/content. For example, if a generic application/content is accessed in the morning, the appearance and the look and feel may be tailored to have an energetic and up tempo feel to it. In contrast, when the generic application/content is accessed in the evening, the appearance and the look and feel may be tailored to have a soothing and relaxing feel to enable the wireless device user to unwind and relax.

At step 440, the customized application may be executed on the server to generate a renderable customized application. Execution of the customized application on the server relieves the wireless device from processing and executing the customized application. Thus, the amount of processing by the wireless device is reduced that leads to conservation of battery power. It is appreciated that the renderable customized application can be used by the wireless device to readily render the application/content that is customized based on the custom configuration.

At step 450, the generic application/content may be optionally provided with additional information, e.g., advertising. It is appreciated that the additional information is tailored based on the wireless device access attributes. Thus, the generic application/content is tailored with additional information that targets the user specifically based on the wireless device access attributes. For example, the wireless device access attributes may be based on the location of the wireless device. Thus, if the location is close to a bar, the user may be provided with a coupon for a free martini at a bar close to the user. Thus, not only the user is more likely to benefit from targeted advertising but the success rate of advertising is improved as well. It is appreciated that the providing additional information such as advertising may be based on location, time and date, to name a few. It is further appreciated that the additional information may be injected and supplied to the user along with the generic application/content.

At step 460, the renderable customized application may be provided for transmission to the user. It is appreciated that the renderable customized application may be readily rendered by the wireless device without further need to process or execute the application. Thus, processing required by the wireless device is reduced, which conserves battery power. At step 470, the renderable customized application/content may be transmitted to the wireless device.

As a result, embodiments of the present invention relieve software vendors and content providers from the need to tailor appearance, look and feel of their applications/content because the server automatically tailors the appearance, look and feel of a generic application/content based on a wireless device access attributes. Thus, the cost of developing application/content is reduced.

Moreover, tailoring the appearance, look and feel of a generic application/content based on a wireless device access attributes, e.g., time, location, time zone, season, date, etc., improves user's experience. Similarly, tailoring the appearance, look and feel of a generic application/content based on user's interest, e.g., habit, enhances user's experience by presenting content/application in a manner that conforms to user's interest.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A server implemented method for processing data for rendering on a wireless device of a user, said method comprising:
    at said server, receiving a request over a network to execute a generic application from said wireless device operated by said user at a given location and time, wherein said generic application generates generic visual user interface (UI) components operable to be rendered on said wireless device, wherein an appearance of the generic visual UI components is the same regardless of a location and time of the user;
    receiving, from the wireless device, wireless device access attributes including said given location and time;
    automatically identifying a custom configuration for said generic application based on said wireless device access attributes including said given location and time received from the wireless device, wherein said custom configuration is operable by the server to modify the appearance of said generic application based on a theme selected in response to the wireless device access attributes including said given location and time of the user;
    without any involvement from the user, configuring said generic application based on said custom configuration to generate a customized application having individualized visual UI components for the wireless device, wherein the individualized visual UI components are incorporated as part of the selected theme based on the wireless device access attributes including said given location and time of the user;
    generating by a processor of the server a renderable customized application in a pre-rendering state that is operable for rendering by said wireless device without further processing and execution by a processor of the wireless device; and
    transmitting said renderable customized application to said wireless device to render the customized application with the selected theme having the individualized visual UI components.

2. The server implemented method of claim 1, wherein said wireless device access attributes further comprise user attributes including user's behavioral interaction with said wireless device, user's habit and user's interests.

3. The server implemented method of claim 2, wherein said user attributes are determined by using applications accessed by said user and by using searches made by said user.

4. The server implemented method of claim 1, further comprising:
    providing said generic application with additional content, wherein said additional content is advertising tailored to said user.

5. The server implemented method of claim 4, wherein the tailoring of said advertising is based on a location from which said request to execute said generic application is sent.

6. A server implemented method for processing data for rendering on a wireless device, said method comprising:
    receiving a request to execute a generic application that generates generic content operable to be rendered on said wireless device;
    receiving, from the wireless device, wireless device access attributes;
    automatically identifying a custom configuration for said generic application based on said wireless device access attributes received from the wireless device, wherein said custom configuration is operable by the server to modify an appearance of said generic application based on a theme selected in response to the wireless device access attributes;

configuring said generic application based on said identified custom configuration to generate a customized application having individualized visual components for the wireless device, wherein the application is customized based on the wireless device access attributes;

providing said generic application with additional content, wherein said additional content is advertising tailored to said user, wherein tailoring of said advertising is selected from the group consisting of a time of day that said request to execute said generic application is sent and a date that said request to execute said generic application is sent;

executing said customized application to generate a renderable customized application in a pre-rendering state that is operable for rendering by said wireless device; and preparing said renderable customized application for transmission to said wireless device.

7. The method of claim 6, wherein said wireless device access attributes is selected from the group consisting of location, time zone, date and user attributes.

8. The method of claim 7, wherein said wireless device access attributes further comprise user attributes including user's behavioral interaction with said wireless device, user's habit and user's interests.

9. The method of claim 8, wherein said user attributes are determined by using applications accessed by said user and by using searches made by said user.

10. The method of claim 6, wherein said advertising is tailored based on a location from which said request to execute said generic application is sent.

11. The method of claim 6, further comprising transmitting said renderable customized application to said wireless device.

12. A server system comprising a processor coupled to a bus and a memory coupled to said bus wherein said memory comprises instructions that when executed cause said processor to implement a method for processing data for rendering on a wireless device of a user, said method comprising:

at said server system, receiving a request over a network to execute a generic application from said wireless device operated by said user at a given location and time, wherein said generic application generates generic visual user interface (UI) components operable to be rendered on said wireless device, wherein an appearance of the generic visual UI components is the same regardless of a location and time of the user;

receiving, from the wireless device, wireless device access attributes including said given location and time;

automatically identifying a custom configuration for said generic application based on said wireless device access attributes including said given location and time received from the wireless device, wherein said custom configuration is operable by the server system to modify the appearance of said generic application based on a theme selected in response to the wireless device access attributes including said given location and time of the user;

without any involvement from the user, configuring said generic application based on said custom configuration to generate a customized application having individualized visual UI components for the wireless device, wherein the individualized visual UI components are incorporated as part of the selected theme based on the wireless device access attributes including said given location and time of the user;

generating a renderable customized application in a pre-rendering state that is operable for rendering by said wireless device without further processing and execution by a processor of the wireless device; and transmitting said renderable customized application to said wireless device to render the customized application with the theme having the individualized visual UI components.

13. The server system of claim 12, wherein said wireless device access attributes further comprise user attributes including user's behavioral interaction with said wireless device, user's habit and user's interests.

14. The server system of claim 13, wherein said user attributes are determined by using applications accessed by said user and by using searches made by said user.

15. The server system of claim 12, further comprising: providing said generic application with additional content, wherein said additional content is advertising tailored to said user.

16. The server system of claim 15, wherein tailoring of said advertising is selected from the group consisting of a time of day that said request to execute said generic application is sent and a date that said request to execute said generic application is sent.

17. The server system of claim 15, wherein tailoring of said advertising is based on a location from which said request to execute said generic application is sent.

18. The server system of claim 12, further comprising: transmitting said renderable customized application to said wireless device.

19. A non-transitory computer-useable medium having computer-readable program code stored thereon for causing a server system to execute a method for processing data for rendering on a wireless device of a user, said method comprising:

at said server system, receiving a request over a network to execute a generic application from said wireless device operated by said user at a given location and time, wherein said generic application generates generic visual user interface (UI) components operable to be rendered on said wireless device, wherein an appearance of the generic visual UI components is the same regardless of a location and time of the user;

receiving, from the wireless device, wireless device access attributes including said given location and time;

automatically identifying a custom configuration for said generic application based on said wireless device access attributes including said given location and time received from the wireless device, wherein said custom configuration is operable by the server system to modify the appearance of said generic application based on a theme selected in response to the wireless device access attributes including said given location and time;

without any involvement from the user, configuring said generic application based on said custom configuration to generate a customized application having individualized visual UI components for the wireless device, wherein the individualized visual UI components are incorporated as part of the selected theme based on the wireless device access attributes including said given location and time of said user;

generating by a processor of the server system a renderable customized application in a pre-rendering state that is operable for rendering by said wireless device without further processing and execution by a processor of the wireless device; and transmitting said renderable customized application to said wireless device to render the customized application with the theme having the individualized visual UI components.

20. The non-transitory computer-useable medium of claim 19, wherein said wireless device access attributes further comprise user attributes including user's behavioral interaction with said wireless device, user's habit and user's interests.

21. The non-transitory computer-useable medium of claim 20, wherein said user attributes are determined by using applications accessed by said user and by using searches made by said user.

22. The non-transitory computer-useable medium of claim 19, further comprising:

providing said generic application with additional content, wherein said additional content is advertising tailored to said user.

23. The non-transitory computer-useable medium of claim 22, wherein tailoring of said advertising is selected from the group consisting of a time of day that said request to execute said generic application is sent and a date that said request to execute said generic application is sent.

24. The non-transitory computer-useable medium of claim 22, wherein tailoring of said advertising is based on a location from which said request to execute said generic application is sent.

* * * * *